United States Patent
Sakamoto et al.

(10) Patent No.: US 9,346,453 B2
(45) Date of Patent: May 24, 2016

(54) TRANSMISSION DEVICE

(71) Applicant: HONDA MOTOR CO., LTD., Tokyo (JP)

(72) Inventors: Naoki Sakamoto, Wako (JP); Eiji Kittaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/483,732

(22) Filed: Sep. 11, 2014

(65) Prior Publication Data
US 2015/0080177 A1    Mar. 19, 2015

(30) Foreign Application Priority Data

Sep. 17, 2013   (JP) .................................. 2013-191816

(51) Int. Cl.
| | | |
|---|---|---|
| *B60W 10/02* | (2006.01) | |
| *B60W 10/101* | (2012.01) | |
| *B60W 10/04* | (2006.01) | |
| *F16H 61/688* | (2006.01) | |
| *F16H 61/06* | (2006.01) | |
| *F16D 48/06* | (2006.01) | |
| *F16D 21/02* | (2006.01) | |
| *F16D 21/06* | (2006.01) | |
| *F16H 59/74* | (2006.01) | |

(52) U.S. Cl.
CPC ............. *B60W 10/101* (2013.01); *B60W 10/02* (2013.01); *B60W 10/04* (2013.01); *F16D 48/062* (2013.01); *F16H 61/061* (2013.01); *F16H 61/688* (2013.01); *F16D 21/02* (2013.01); *F16D 2021/0653* (2013.01); *F16D 2500/1083* (2013.01); *F16D 2500/1085* (2013.01); *F16D 2500/3056* (2013.01); *F16D 2500/3058* (2013.01); *F16D 2500/3067* (2013.01); *F16D 2500/30816* (2013.01); *F16D 2500/30825* (2013.01); *F16D 2500/31466* (2013.01); *F16D 2500/50239* (2013.01); *F16D 2500/50293* (2013.01); *F16D 2500/70217* (2013.01); *F16D 2500/70406* (2013.01); *F16D 2500/70448* (2013.01); *F16H 59/74* (2013.01); *Y10T 477/641* (2015.01)

(58) Field of Classification Search
None
See application file for complete search history.

(56) References Cited

U.S. PATENT DOCUMENTS

| | | | | |
|---|---|---|---|---|
| 5,449,329 | A * | 9/1995 | Brandon | F16H 61/061 477/143 |
| 5,505,287 | A * | 4/1996 | Asatsuke | F16H 1/0009 137/625.69 |
| 2005/0037893 | A1 * | 2/2005 | Siebigteroth | F16H 61/061 477/176 |
| 2011/0247443 | A1 * | 10/2011 | Shimizu | F16H 61/0021 74/473.11 |

FOREIGN PATENT DOCUMENTS

JP    2007-092907    4/2007

* cited by examiner

*Primary Examiner* — Justin Holmes
*Assistant Examiner* — David Morris
(74) *Attorney, Agent, or Firm* — Rankin, Hill & Clark LLP

(57) ABSTRACT

A compact transmission device that alleviates shift shock and avoids engine stall at the time of deceleration. A discharge resistance changing unit changes discharge resistance of a clutch oil pressure on a side where a clutch is disconnected due to swapping of clutches in two stages. During a shift period where the clutch on a connection side is changed over from a disconnection state to a connection state, an invalid filling zone where a friction force is not generated on a clutch plate is provided. A control unit controls the discharge resistance changing unit at a time of the shift change such that the clutch on a disconnection side is brought into a state where a friction force is not generated after finishing a half clutch zone when the clutch on a connection side is in a half clutch zone after the invalid filling zone is finished.

16 Claims, 8 Drawing Sheets

TRANSMISSION DEVICE

BACKGROUND OF THE INVENTION

1. Field of the Invention

The present invention generally relates to a transmission device and, more particularly, to a transmission device including an automatic transmission that performs a shift change by a switching operation of a twin clutch.

2. Description of Related Art

Conventionally, there has been known an automatic transmission that includes a hydraulic twin clutch for a transmission and that can perform a shift change without interrupting the transmission of a rotational drive force by changing over, with a neighboring gear, a connection state from a clutch on one side to a clutch on the other side.

JP-A-2007-92907 discloses a twin clutch type automatic transmission that includes an orifice mechanism by which lowering of an oil pressure in a clutch on a side where the clutch is disconnected by a swapping operation is alleviated, thus suppressing a shift shock, which is caused due to an excessively high lowering speed of the oil pressure.

With respect to a twin clutch type automatic transmission, there has been known the constitution where a transmission control is performed by a twin clutch and a half clutch control at the time of starting is performed by a centrifugal clutch provided independently from the twin clutch. In studying the miniaturization of such an automatic transmission, as one of methods for miniaturizing the automatic transmission, it is considered that the centrifugal clutch is removed by also performing the half clutch control at the time of starting using the twin clutch.

However, when the centrifugal clutch is simply removed from the twin clutch type transmission disclosed in JP-A-2007-92907, a lowering speed of an oil pressure at the time of disconnecting the clutch is suppressed by the orifice mechanism. Hence, for example, at the time of rapid deceleration that may cause locking of a drive wheel immediately after a shift change, when an oil temperature of a working oil is low and has high viscosity, it takes time before a working oil pressure in the clutch on a disconnection side is completely lowered. Therefor, an engine rotational speed is lowered before the clutch is brought into a disconnection state whereby there is a possibility that an engine stall occurs. Accordingly, it is necessary to take a countermeasure against such an engine stall.

SUMMARY OF THE INVENTION

It is an object of the invention to overcome the above-mentioned drawbacks of the related art, and to provide a compact transmission device that can satisfy both the alleviation of a shift shock and the avoidance of an engine stall at the time of deceleration without using a centrifugal clutch.

To achieve the above-mentioned object, the invention provides a transmission device including a crank shaft of an engine; a drive wheel; two hydraulic clutches that are interposed between the crank shaft and the drive wheel and perform connection and disconnection due to pressurization and depressurization of a working oil, and are biased toward a disconnection side by a return spring; and gear trains that respectively correspond to the two hydraulic clutches, wherein the transmission device performs a shift change by selecting the gear train corresponding to two hydraulic clutches by swapping two hydraulic clutches. The transmission further includes an oil pressure generating unit that is a source for generating an oil pressure supplied to the two hydraulic clutches; an oil pressure adjusting unit that is interposed between the oil pressure generating unit and the two hydraulic clutches and adjusts working oil pressures of working oils supplied to the two hydraulic clutches to desired levels; two supply oil passages that are respectively connected to the two hydraulic clutches for supplying the working oil pressures; two discharge oil passages that are respectively connected to the two supply oil passages for depressurizing the working oil pressures supplied to the two hydraulic clutches; an oil passage switching unit that changes over an oil passage between a state where a working oil is discharged from one of the two discharge oil passages while supplying a working oil to one of the two supply oil passages and a state where a working oil is discharged from the other of the two discharge oil passages while supplying a working oil to the other of the two supply oil passages; and a control unit that controls the oil pressure adjusting unit and the oil passage switching unit. The transmission device further includes a discharge resistance changing unit that is provided downstream of the two discharge oil passages and changes the easiness of discharge of the working oil pressures; and an oil temperature measuring unit that measures an oil temperature of the working oils, wherein out of the two hydraulic clutches, the clutch on a connection side that is brought into a connection state after the shift change is configured to generate an invalid filling zone where a friction force is not generated on a clutch plate and a half clutch zone which comes after the invalid filling zone and in which a friction force is generated on the clutch plate during a shift period where a clutch state is changed over from a disconnection state to a connection state, and the clutch on a disconnection side that is brought into a disconnection state after the shift change is configured to generate a half clutch zone during a period where the clutch state is changed over to a disconnection state from a connection state, and the control unit controls the discharge resistance changing unit corresponding to a measured value of the oil temperature measuring unit at the time of the shift change such that the clutch on a disconnection side that is brought into a disconnection state after the shift change is brought into a state where a friction force is not generated after finishing a half clutch zone when the clutch on a connection side is in a half clutch zone after the invalid filling zone is finished.

Accordingly, it is possible to prevent a phenomenon where two clutches are simultaneously brought into a state where a frictional force is not generated and hence, it is possible to perform a shift change with no racing of the engine or a shift shock caused by racing of the engine. Further, the clutch on a disconnection side is brought into a state where a frictional force is not generated in a state where the clutch on a connection side is in the half clutch period before the complete connection and hence, in the post-stage which follows the pre-stage, it is possible to enhance the toughness to an engine stall when rapid deceleration is made immediately after a shift change by lowering an oil pressure on a disconnection side earlier.

Further, under a temperature environment where the operation of the engine is expected, the adjustment can be performed in accordance with a change in viscosity of a working oil caused by oil temperature can be performed and hence, it is possible to acquire both the favorable shift feeling and the favorable toughness to an engine stall without being influenced by a change in oil temperature.

In further accordance with the present invention, the discharge resistance changing unit makes the discharge of the working oil pressures difficult in a pre-stage, which is a zone ranging from starting of the shift zone to a predetermined timing, and makes the discharge of the working oil pressures easy in a post-stage, which is a zone ranging from the completion of the pre-stage to the completion of the shift zone. Accordingly, it is possible to realize the discharge resistance changing means with the simple constitution.

In further accordance with the present invention, the discharge resistance changing unit is configured to change over the discharge resistance in two stages, and the control unit changes over the discharge resistance such that the discharge resistance is large in the pre-stage and the discharge resistance is small in the post-stage. Accordingly, it is possible to realize the discharge resistance changing means with the simple constitution.

In further accordance with the present invention, the discharge resistance changing unit is configured to be driven only in the pre-stage so as to increase the discharge resistance. Accordingly, by driving the discharge resistance changing means only in the pre-stage which occupies a small ratio of a total operation state, power consumption and a control load of an actuator can be reduced.

In further accordance with the present invention, the discharge resistance changing unit is arranged downstream of a merging portion where the two discharge oil passages are merged into one merged discharge oil passage, and the discharge resistance changing unit includes: a first release hole and a second release hole; a valve mechanism that is capable of opening or closing the second release hole; a biasing unit that holds the valve mechanism in an open state; and an actuator that moves the valve mechanism in the closing direction when a closing instruction is given from the control unit. Accordingly, it is possible to realize the discharge resistance changing means with the simple constitution.

In further accordance with the present invention, the control unit, when an oil temperature of the working oil falls within a predetermined range, shortens the pre-stage in accordance with lowering of the oil temperature. Accordingly, by setting a length of the pre-stage by taking into account the invalid filling zone, it is possible to suppress racing of an engine and, at the same time, it is possible to efficiently enhance the toughness to an engine stall.

DETAILED DESCRIPTION OF THE INVENTION

Figure 1:
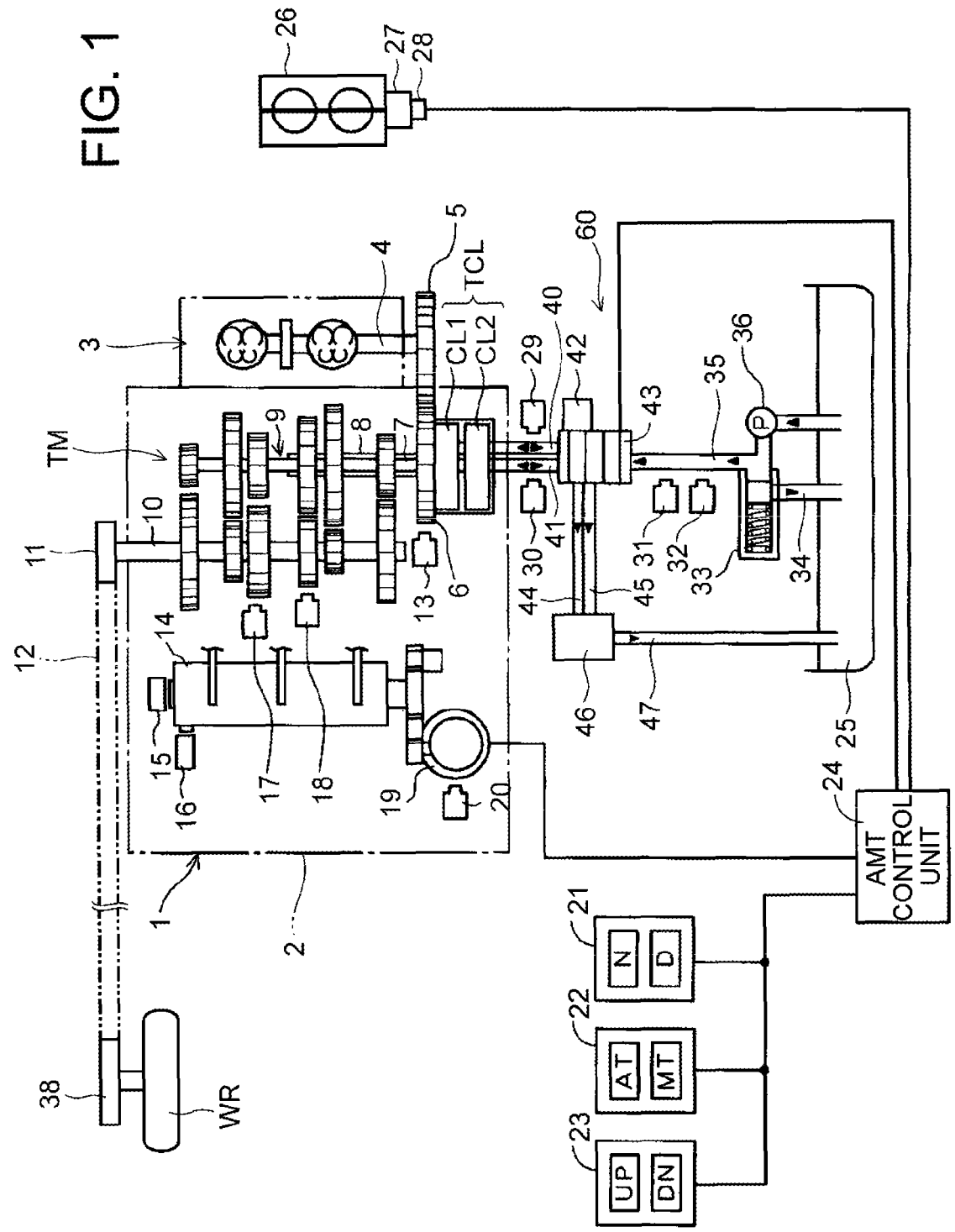
FIG. 1 is a system constitutional view of an automatic manual transmission which constitutes a transmission device according to one embodiment of the invention and devices on the periphery of the automatic manual transmission.

Hereinafter, a preferred embodiment of the invention is explained in detail by reference to drawings. FIG. 1 is a system constitutional view of an automatic manual transmission (hereinafter, referred to as "AMT") 1 which constitutes a transmission device according to one embodiment of the invention and devices on the periphery of the AMT 1. An engine 3 is configured such that the connection or the disconnection of a rotational drive force is performed between the engine 3 and a transmission by a twin clutch consisting of a first clutch and a second clutch, and an oil pressure supplied to the twin clutch is controlled by an actuator.

The AMT 1 is constituted as a twin clutch type automatic transmission that connects or disconnects a rotational drive force of the engine 3 by two clutches arranged on a main shaft. A drive control of the AMT 1 housed in a crankcase 2 is performed by a clutch-use hydraulic device 60 and an AMT control unit 24 which constitutes a control means. The clutch-use hydraulic device 60 includes therein: a linear solenoid 43 that constitutes an oil pressure adjusting unit for adjusting a level of an oil pressure supplied to the clutches, that is, a working oil pressure of working oil supplied to the clutches; a shift valve 42 that constitutes an oil passage switching unit for changing over the supply destination of a working oil pressure; and a shift solenoid (see FIG. 2) that drives the shift valve 42. The engine 3 includes a throttle-by-wire type throttle body 26 having a throttle valve motor 27 for opening or closing a throttle valve.

The AMT 1 includes: a forward-six-speed sequential type transmission TM; a twin clutch TCL constituted of a first clutch CL1 and a second clutch CL2; a shift drum 14; and a shift control motor 19 that rotates the shift drum 14. A large number of gears that constitute the transmission TM is joined to or fitted on a main shaft 9 and a counter shaft 10 respectively. The main shaft 9 is constituted of an inner main shaft 7 and an outer main shaft 8. The inner main shaft 7 is joined to the first clutch CL1 and the outer main shaft 8 is joined to the second clutch CL2. Shift gears, which are shiftable in the axial direction of the main shaft 9 and in the axial direction of the counter shaft 10, are mounted on the main shaft 9 and the counter shaft 10, respectively, and end portions of shift forks are engaged with a plurality of guide grooves formed on the shift gears and the shift drum 14, respectively.

A primary drive gear 5 is joined to a crankshaft 4 of the engine 3, and the primary drive gear 5 is meshed with a primary driven gear 6. The primary driven gear 6 is connected to the inner main shaft 7 by way of the first clutch CL1, and also is connected to the outer main shaft 8 by way of the second clutch CL2. In the vicinity of outer peripheral surfaces of the predetermined shift gears on the counter shaft 10, an inner main shaft rotational speed sensor 17 and an outer main shaft rotational speed sensor 18 are arranged. These sensors 17, 18 are provided for detecting a rotational speed of the inner main shaft 7 and a rotational speed of the outer main shaft 8 by measuring rotational speeds of the respective shift gears.

The inner main shaft rotational speed sensor 17 detects a rotational speed of a shift gear on a driven side that is meshed with a shift gear mounted on the inner main shaft 7 in a non-rotatable manner and that is mounted on the counter shaft 10 in a rotatable and non-slidable manner. The outer main shaft rotational speed sensor 18 detects a rotational speed of a shift gear on a driven side that is meshed with a shift gear that is mounted on the outer main shaft 8 in a non-rotatable manner and that is mounted on the counter shaft 10 in a rotatable and non-slidable manner.

A drive sprocket 11 is fixed to an end portion of the counter shaft 10. A rotational drive force of the engine 3 is transmitted to a driven sprocket 38 fixed to the rear wheel WR by way of a drive chain 12 wound around the drive sprocket 11.

In the inside of the AMT 1, there are provided: an engine rotational speed sensor 13 that is arranged on an outer periphery of the primary driven gear 6 in an opposed manner; a gear position sensor 15 that detects a gear position of the transmission TM based on a rotational position of the shift drum 14; a shifter sensor 20 that detects a rotational position of a shifter driven by the shift control motor 19, and a neutral switch 16 that detects that the shift drum 14 is at a neutral position. Further, the throttle body 26 includes a throttle opening sensor 28 that detects throttle opening.

The clutch hydraulic device 60 includes an oil tank 25, and a pipe passage 35 through which oil (working oil) in the oil tank 25 is supplied to the first clutch CL1 and the second clutch CL2. In this embodiment, oil is used as lubrication oil for the engine 3 and as working oil for driving the twin clutch. On the pipe passage 35, there are provided a hydraulic pump 36 that constitutes an oil pressure generating unit, the linear solenoid 43 that adjusts a level of an oil pressure supplied to the twin clutch, and the shift valve 42 that changes over the destination to which an oil pressure is supplied. A regulator 33 that suppresses an oil pressure to a value that falls within a predetermined upper limit is arranged on a return pipe passage 34 connected to the pipe passage 35.

In this embodiment, the shift valve 42 and the linear solenoid 43 are housed in a case that is formed as an integral body. The linear solenoid 43 is of a normally open type where a pipe passage is fully opened when the linear solenoid 43 is not energized. The linear solenoid 43 can perform a half clutch control at the time of starting the engine or the like by restricting a supply oil pressure to a desired value by restricting a pipe passage area by energization.

The shift valve 42 includes discharge oil passages 44, 45 that constitute return pipe passages from the first clutch CL1 and the second clutch CL2. An orifice mechanism 46 is connected to end portions of the discharge oil passages 44, 45. The orifice mechanism 46 constitutes a discharge resistance changing unit for adjusting discharge resistance of working oil, that is, a lowering speed of an oil pressure at two stages. Working oil that passes the orifice mechanism 46 is returned to the oil tank 25 through the return oil passage 47.

To a pipe passage 40 that connects the shift valve 42 and the first clutch CL1, a first oil pressure sensor 29 that measures an oil pressure generated in the pipe passage, that is, an oil pressure generated in the first clutch CL1 is provided. In the same manner, to a pipe passage 41 that connects the shift valve 42 and the second clutch CL2, a second oil pressure sensor 30 that measures an oil pressure generated in the second clutch CL2 is provided. Further, a main oil pressure sensor 31 and an oil temperature sensor 32 are provided to the pipe passage 35 that connects the hydraulic pump 36 and the linear solenoid 43.

To the AMT control unit 24, a neutral select switch 21 that performs switching between a neutral position (N) and a drive position (D), a mode switch 22 that performs switching between an automatic transmission (AT) mode and a manual transmission (MT) mode, and a shift select switch 23 that performs a gear shift instruction of shift-up (UP) or shift-down (DN) are connected. The AMT control unit 24 includes a central processing unit (CPU), and controls the linear solenoid 43, the shift valve 42 and the shift control motor 19 in response to output signals from the above-mentioned respective sensors and switches thus automatically or semi-automatically changing over a shift gear position of the AMT 1.

The AMT control unit 24 automatically changes over a shift position in response to information such as a vehicle speed, an engine rotational speed or throttle opening when an AT mode is selected, and changes over a shift position in response to a manipulation of the shift select switch 23 when an MT mode is selected.

When the linear solenoid 43 is opened to a predetermined degree of opening and the destination to which an oil pressure is supplied is determined by operating the shift solenoid 42 in accordance with an instruction from the AMT control unit 24, an oil pressure is applied to the first clutch CL1 or the second clutch CL2. Accordingly, the primary driven gear 6 is connected to the inner main shaft 7 or the outer main shaft 8 by way of the first clutch CL1 or the second clutch CL2. Both the first clutch CL1 and the second clutch CL2 are formed of a normally-open type hydraulic clutch where when applying of an oil pressure is stopped, the first clutch CL1 and the second clutch CL2 are biased in the direction that the first clutch CL1 and the second clutch CL2 are disconnected from the inner main shaft 7 and the outer main shaft 8 by return springs (not shown in the drawing) incorporated in the first clutch CL1 and the second clutch CL2, and return to initial positions.

The shift control motor 19 rotates the shift drum 14 in accordance with an instruction from the AMT control unit 24. When the shift drum 14 is rotated, the shift fork is displaced in the axial direction of the shift drum 14 in accordance with a shape of a guide groove formed on an outer periphery of the shift drum 14. Due to such an operation, meshing between the gear mounted on the counter shaft 10 and the gear mounted on the main shaft 9 is changed.

In this embodiment, the inner main shaft 7, which is joined to the first clutch CL1, supports the odd-numbered position gears (1, 3, 5 speed positions), and the outer main shaft 8, which is joined to the second clutch CL2, supports the even-numbered position gears (2, 4, 6 speed positions). Accordingly, for example, during a period where the vehicle travels using odd-numbered position gears, the supply of an oil pressure to the first clutch CL1 is continued so that a connection state is maintained. At the time of performing a shift change, by changing meshing of the gears by rotating the shift drum 14 in advance, a shift operation can be completed by merely swapping the connection states of both clutches.

Figure 2:
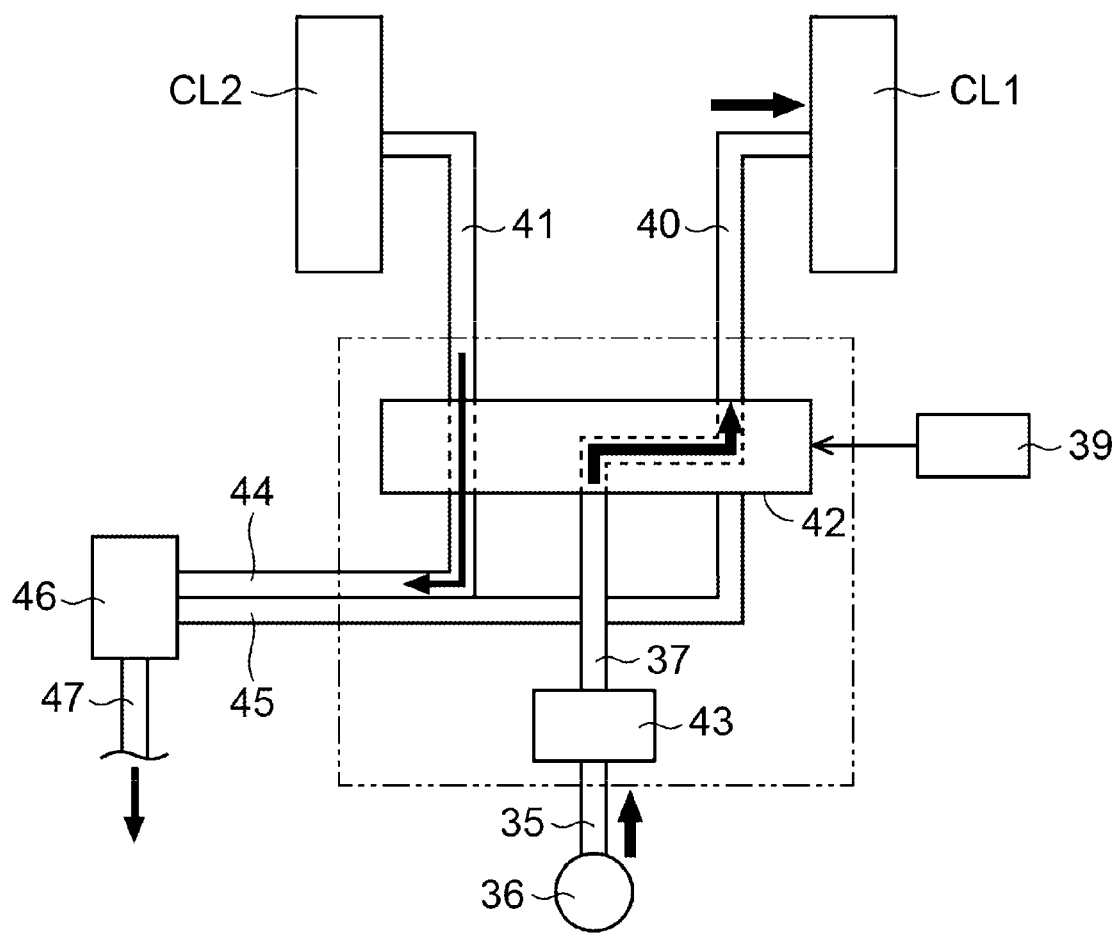
FIG. 2 is a schematic view showing an oil pressure supply state at the time of swapping to a first clutch.
Figure 3:
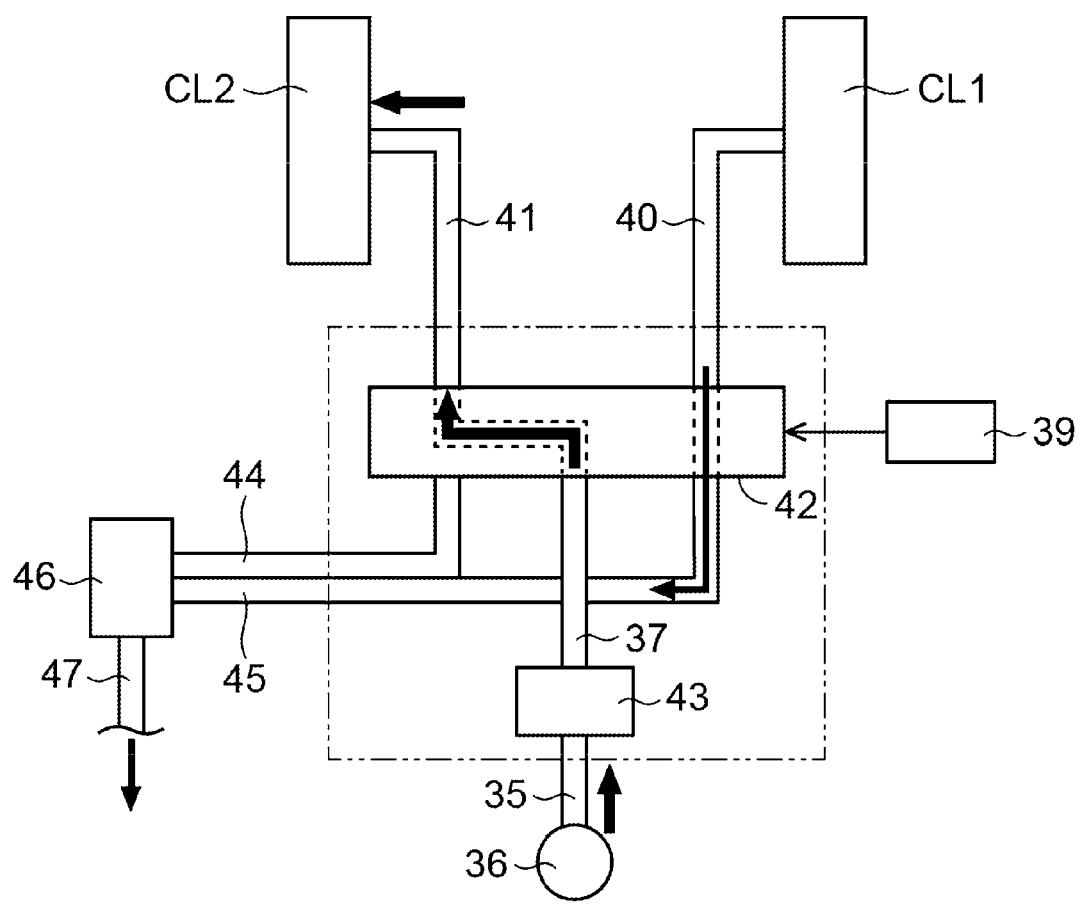
FIG. 3 is a schematic view showing an oil pressure supply state at the time of swapping to a second clutch.

FIG. 2 and FIG. 3 are schematic views showing a state of supplying an oil pressure brought about by changing over the shift valve 42. The linear solenoid 43 adjusts an oil pressure generated by the oil pressure pump 36 to a working oil pressure of a desired level, and supplies the oil pressure to the shift valve 42. The shift valve 42 is driven by the shift solenoid 39, and changes over the supply destination of the working oil to the first clutch CL1 or the second clutch CL2 in a state where the working oil is supplied and the working oil pressure is generated.

The shift valve 42 connects the second clutch CL2 and the discharge oil passage 44 to each other when the supply destination of a working oil is set to the first clutch CL1, while the shift valve 42 connects the first clutch CL1 and the discharge oil passage 45 to each other when the supply destination of the oil pressure is set to the second clutch CL2.

Accordingly, as shown in FIG. 2, when the clutch on a connection side is changed over to the first clutch CL1 from the second clutch CL2, the supply of an oil pressure to the pipe passage 40 is started, and a working oil that generates a working oil pressure in the second clutch CL2 is discharged to the orifice mechanism 46 by way of the discharge oil passage 44. On the other hand, as shown in FIG. 3, when the clutch on a connection side is changed over to the second clutch CL2 from the first clutch CL1, the supply of an oil pressure to the pipe passage 41 is started, and a working oil that generates a working oil pressure in the first clutch CL1 is discharged to the orifice mechanism 46 by way of the discharge oil passage 45.

When a lowering speed of an oil pressure on a clutch on a disconnection side at the time of swapping the clutch is excessively high, a shift shock is generated, while when the lowering speed of the oil pressure is excessively low, an engine stall is generated at the time of rapid deceleration, as described previously. Accordingly, in this embodiment, the lowering speed of the oil pressure is changed over in two stages by the orifice mechanism 46 and, at the same time, switching timing of the lowering speed is adjusted, thus preventing also an engine stall while decreasing a shift shock.

Figure 4:
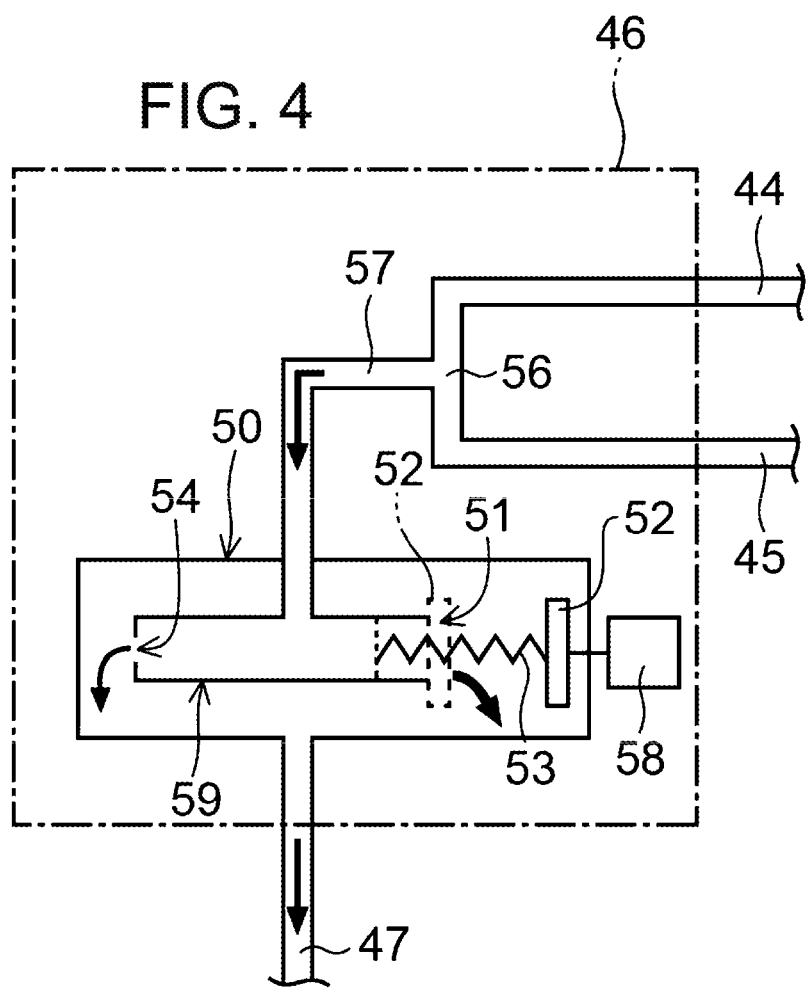
FIG. 4 is a schematic view showing the structure of an orifice mechanism.

FIG. 4 is a schematic view showing the structure of the orifice mechanism 46. The discharge oil passages 44, 45 are merged at a merging portion 56 in the orifice mechanism 46, and a merged discharge oil passage 57 after merging is connected to the case 50. An orifice 59 having two large and small open holes is arranged in the case 50, and the merged discharge oil passage 57 is connected to an approximately center portion of the orifice 59.

The small open hole 54, which constitutes a first open hole, is formed on one end side (left end portion in the drawing) of the orifice 59, and the large open hole 51, which constitutes a second open hole, is formed on the other end side (right end portion in the drawing). A valve mechanism 52, which is biased in the opening direction by a biasing member 53 formed of a spring or the like, is formed in the large open hole 51, and the valve mechanism 52 is opened or closed by an orifice control solenoid (hereinafter, referred to as OC solenoid) 58.

The OC solenoid 58, only when the OC solenoid 58 is energized in accordance with an instruction from the AMT control unit 24, pushes and brings the valve mechanism 52 into contact with the large open hole 51 against a biasing force of the biasing member 53 and closes the large open hole 51. Accordingly, working oil introduced into the orifice 59 through the merged discharge oil passage 57 is discharged from the large open hole 51 and the small open hole 54 when the OC solenoid 58 is not energized, and is discharged only from the small open hole 54 when the OC solenoid 58 is energized. Accordingly, a lowering speed of an oil pressure in the clutch on a disconnection side is changed over in two stages.

Figure 5:
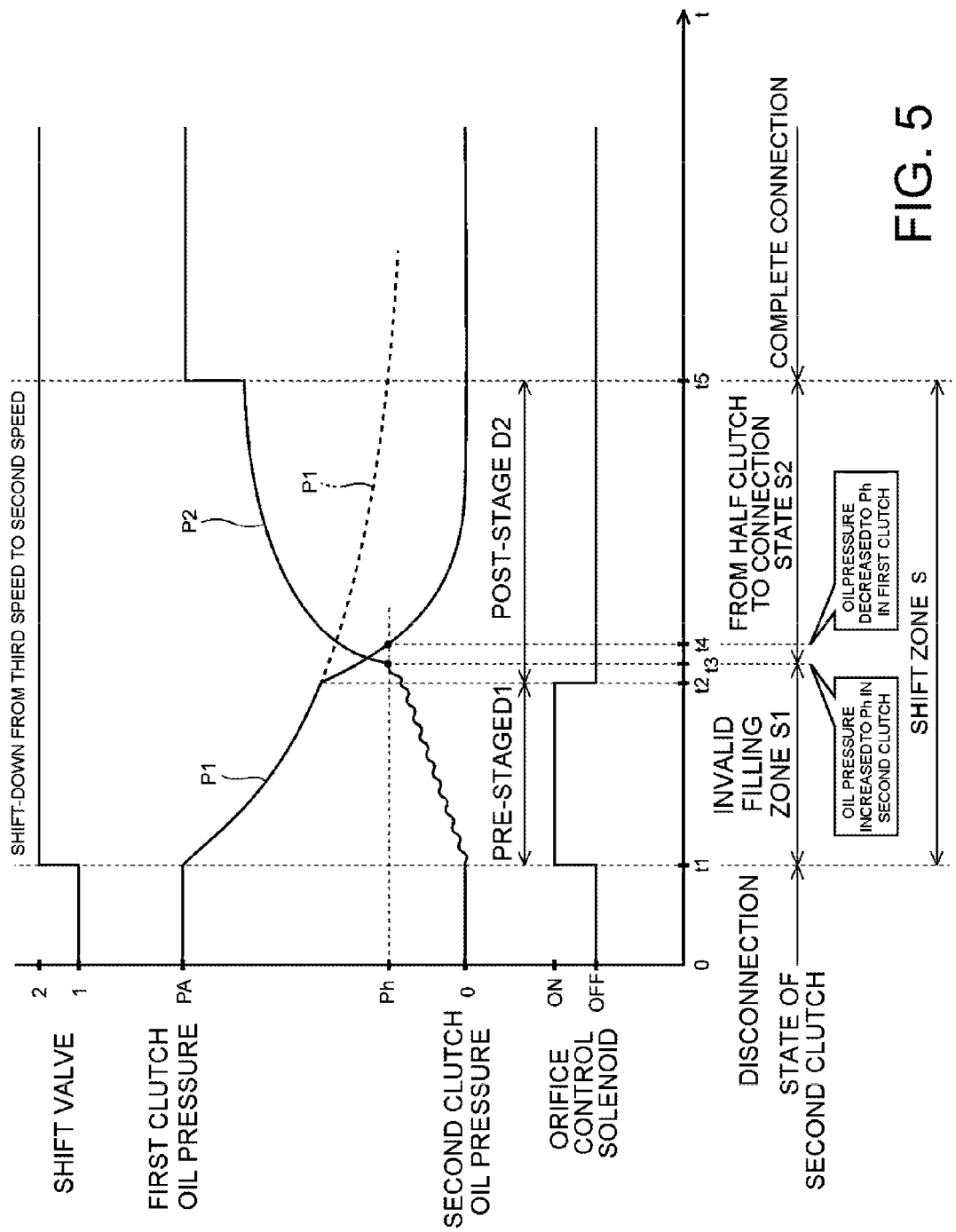
FIG. 5 is a graph showing the transition of clutch oil pressures at the time of swapping clutches.

FIG. 5 is a graph showing the transition of a clutch oil pressure at the time of swapping the clutches. The graph shows the flow at the time of shift-down from a third speed to a second speed, that is, when a connection state of the clutch is swapped from the first clutch CL1 to the second clutch CL2.

At a point of time t (t=0) during traveling at a third speed, the shift valve 42 is in a status 1 so that a complete connection oil pressure PA is supplied to the first clutch CL1, and an oil pressure supplied to the second clutch CL2 is zero. The OC solenoid 58 is in an OFF (non-energized) state. The complete connection oil pressure PA is a value which is obtained by leaving a margin in clutch capacity at which a maximum torque of the engine can be transmitted.

Next, at a point of time t1, a shift-down instruction from a third speed to a second speed is issued in accordance with an instruction from the AMT control unit 24. In accordance with the shift-down instruction, the shift valve 42 is changed over to a status 2 and, at the same time, the OC solenoid 58 is changed over to an ON (energized) state.

At this point of time t1, before a drive-side clutch plate and a driven-side clutch plate of the second clutch CL2 are brought into contact with each other so that the second clutch CL2 is brought into a half clutch state, an invalid filling zone is started where a second clutch oil pressure P2, which is a working oil pressure of the second clutch CL2, is gradually increased. Along with such an operation, lowering of a first clutch oil pressure P1, which is the working oil pressure of the first clutch CL1, is started. However, the OC solenoid 58 is in an ON state and, hence, the discharge resistance is large whereby the lowering speed of the oil pressure is suppressed, thus forming a gentle lowering curve.

At a point of time t2, the OC solenoid 58 is changed over to an OFF state and hence, discharge resistance of an oil pressure is decreased whereby a lowering speed of the first clutch oil pressure P1 is increased. At a point of time t3, which comes immediately after the point of time t2, the second clutch oil pressure P2 reaches a predetermined oil pressure Ph so that the invalid filling zone S1 is finished and, at the same time, an increase rate of the oil pressure P2 of the second clutch CL2 is increased so that the second clutch CL2 is shifted to a connection state S2 from the half clutch state. Here, the predetermined oil pressure Ph is an oil pressure at a boundary where the drive-side clutch plate and the driven-side clutch plate that are spaced apart from each other in a disconnection state are started to be brought into contact with each other against a biasing force of a return spring of the clutch plate. That is, the predetermined oil pressure Ph is an oil pressure at a boundary where the half clutch state is started.

Next, at a next point of time t4, the first clutch oil pressure P1 whose lowering speed is accelerated at the point of time t2 is lowered to the predetermined oil pressure Ph whereby the first clutch is brought into a state where a friction force is not generated. However, at this point of time, the second clutch oil pressure P2 is already increased to a value larger than the predetermined oil pressure Ph and, hence, the half clutch is already started in the second clutch whereby there is no possibility that the transmission of a drive force by the second clutch is interrupted.

Then, at a point of time t5 at which the second clutch oil pressure P2 is increased to an oil pressure sufficient for transmission of a drive force, the oil pressure P2 is increased to a complete connection oil pressure PA, and a clutch swapping control which is brought about by shift-down is completed. In this embodiment, a period that ranges from the point of time t1 to the point of time t2 where the OC solenoid 58 is energized is referred to as "pre-stage D1", and a period that comes after the pre-stage D1 and ranges from the point of time t2 to the point of time t5 where the OC solenoid 58 is deenergized so that a connection oil pressure PA is supplied to the second clutch CL2 is referred to as "post-stage D2". An oil pressure at a point of time that a half clutch state is started after an invalid filling zone S1 of the clutch on a connection side is finished (a frictional force that has not been generated is started to be generated), and an oil pressure at a point of time where an oil pressure of the clutch on a disconnection side that has been in a connection state is discharged so that a half clutch state is started (a frictional force that has been generated is not generated) take the same value (predetermined oil pressure Ph) theoretically. However, the slight difference may be generated between these oil pressures due to a delay in response of working oil depending on an engine rotational speed or viscosity of the working oil.

In the swapping control of the clutch, when a fixed type orifice is used unlike the switching type orifice mechanism of this embodiment, a lowering speed of the first clutch oil pressure P1 cannot be increased in the course of lowering of the first clutch oil pressure P1 and, hence, a lowering curve becomes gentle as indicated by a broken line in the drawing.

In this case, for example, at the point of time t3, the first clutch CL1 is still in a state where the first clutch CL1 can transmit a drive force. Accordingly, there is a possibility that the engine is stalled when the rapid deceleration is performed immediately after shift-down and hence, it is necessary to avoid a stall by additionally providing a centrifugal clutch or the like.

To the contrary, according to the two-stage switching type orifice mechanism according to this embodiment, during the front half period (pre-stage D1) of the clutch swapping operation, the discharge resistance of an oil pressure is increased and, hence, a lowering speed of the oil pressure is decreased whereby the increase of an engine rotational speed Ne and a shift shock can be prevented. At the same time, in the latter half period (post-stage D2) of the clutch swapping operation, the discharge resistance of an oil pressure is decreased and, hence, a lowering speed of the oil pressure is increased whereby the first clutch CL1 can be quickly disconnected thus preventing an engine stall at the time of deceleration.

The above-mentioned shift zone S and the invalid filling zone S1 and the like may be set to predetermined values set in advance or may be set such that these zones are desirably adjusted in response to various parameters such as an engine rotational speed, the number of gear positions, a vehicle speed and an oil temperature.

Figure 6:
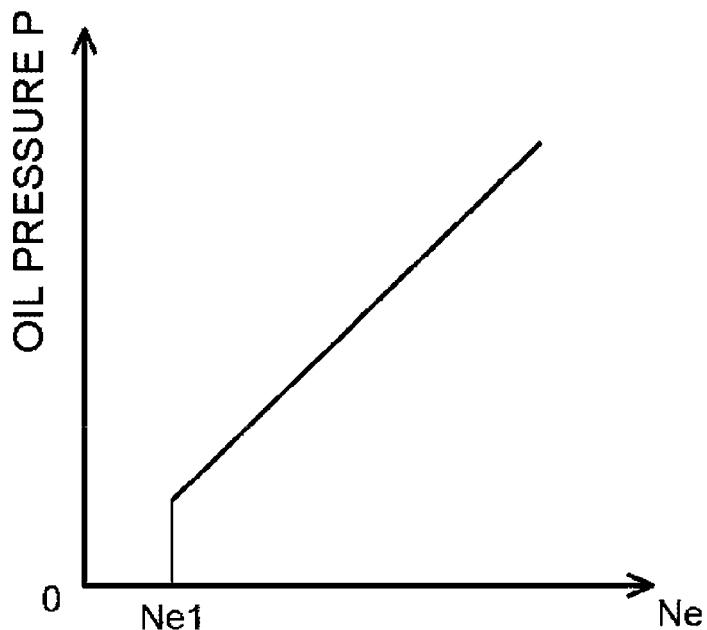
FIG. 6 is a graph showing an oil pressure characteristic of a linear solenoid.

FIG. 6 is a graph showing an oil pressure characteristic of the linear solenoid 43. The linear solenoid 43 according to this embodiment can adjust a level of an oil pressure supplied to the clutch corresponding to the engine rotational speed Ne. Further, in this embodiment, an oil pressure supplied to the clutch is set such that when the engine rotational speed Ne becomes lower than an idling rotational speed Ne1, the supplied oil pressure becomes zero. Accordingly, in combination with switching of a lowering speed of an oil pressure by the above-mentioned orifice mechanism, an engine stall at the time of rapid deceleration can be effectively prevented.

Figure 7:
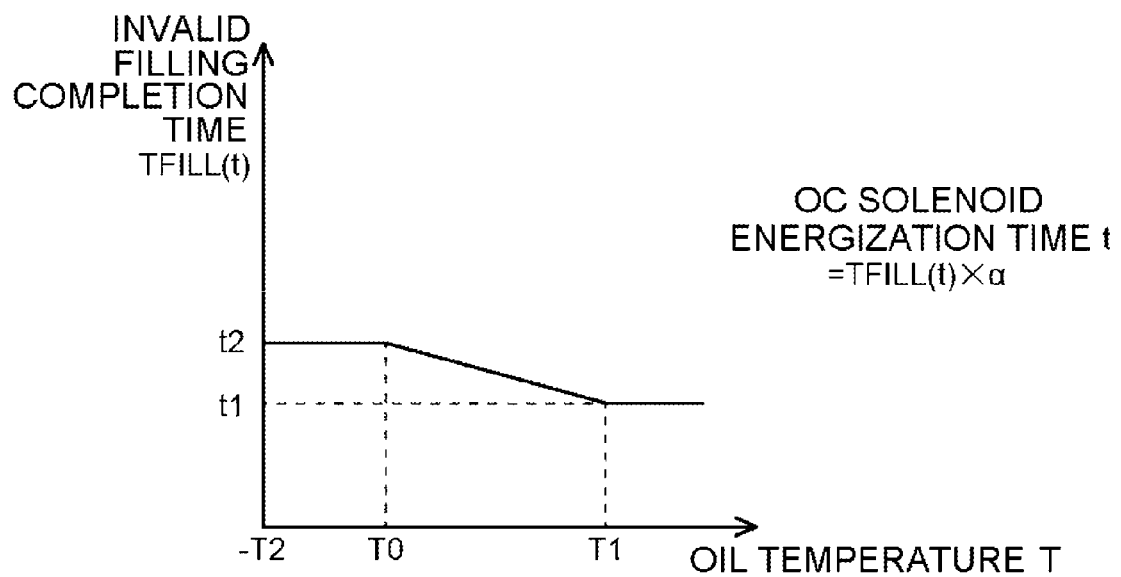
FIG. 7 is a graph showing the relationship between an invalid filling completion time and an oil temperature.
Figure 8:
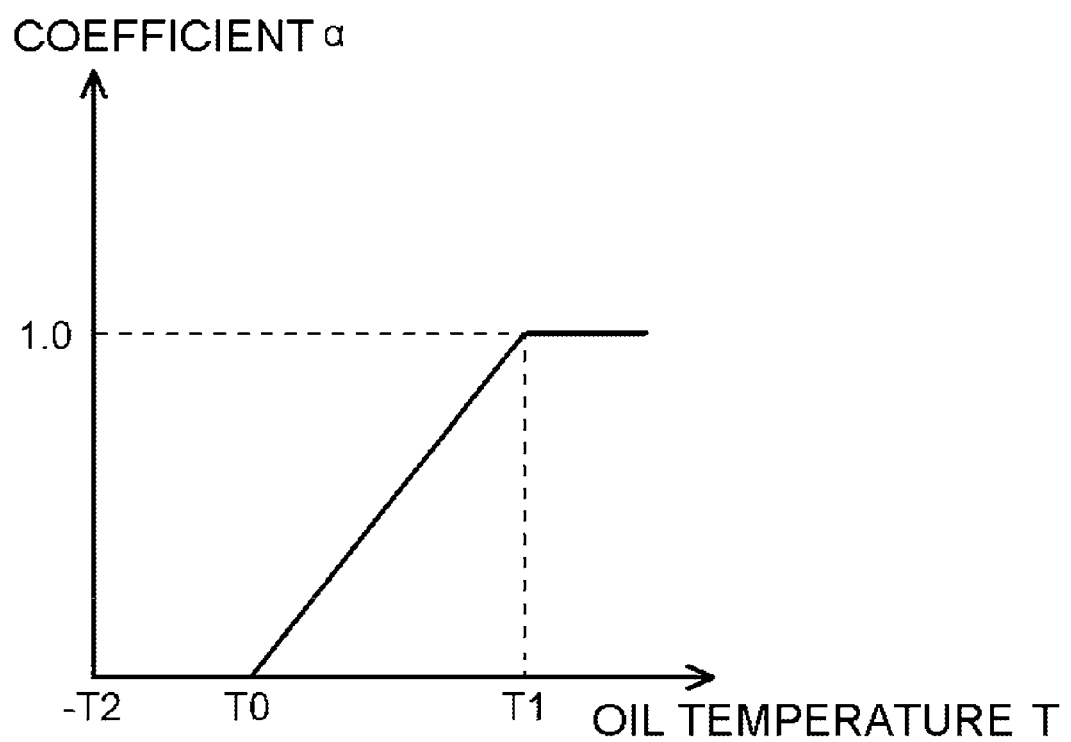
FIG. 8 is a graph showing the relationship between a coefficient α and an oil temperature.

FIG. 7 is a graph showing the relationship between an invalid filling completion time TFILL (t) and an oil pressure T for determining a length of an OC solenoid energization time (pre-stage D1). FIG. 8 is a graph showing the relationship between a coefficient α and the oil temperature T. The working oil, which drives the twin clutch, increases viscosity thereof in a state where the oil temperature is low so that a speed at which the working oil is discharged from an orifice is lowered even when the orifice diameter is equal. Accordingly, in a state where an oil temperature is low, it is desirable to perform the adjustment for shortening a time for energizing the OC solenoid 58 (extending a time during which the orifice diameter is large). In this embodiment, the energization time of the OC solenoid 46, that is, a length of the pre-stage D1 is calculated using the following formula:

invalid filling completion time $TFILL(t) \times$ coefficient α.

As described previously, both the first clutch CL1 and the second clutch CL2 are formed of a normally-open type hydraulic clutch having the structure where the clutch is returned to an initial position in the disconnection direction by a return spring incorporated in the hydraulic clutch when applying of an oil pressure to the clutch is stopped. Accordingly, during a period where the supply of an oil pressure is stopped, a gap is formed between a driven-side clutch plate and a drive-side clutch plate that constitute the clutch. A period from the point of time that the supply of an oil pressure is started to the point of time that the gap is eliminated constitutes an invalid period where a frictional force is not generated between the plates. The invalid filling completion time TFILL (t) is a time from a point of time that the supply of an oil pressure is started to a point of time that the gap is eliminated so that the clutch is brought into a half clutch state.

As shown in FIG. 7, the invalid filling completion time TFILL of the clutch, that is, a time from a point of time the supply of oil pressure to the clutch is started to a point of time that a gap between the clutch plates is eliminated so that both clutch plates are brought into contact with each other is extended in accordance with lowering of the oil temperature T. In this graph, assuming the invalid filling completion time TFILL during which the oil temperature T exceeds T1 (for example, 60° C.) as t1 (for example, 150 ms), and the invalid filling completion time TFILL during which the oil temperature T is T0 (for example, 0° C.) or below as t2 (for example, 250 ms), the invalid filling completion time TFILL is set such that the invalid filling completion time TFILL is extended in accordance with lowering of the oil temperature T during a period where the oil temperature T1 falls within a range of T0 to T1.

On the other hand, a coefficient α shown in FIG. 8 is set to be decreased in accordance with lowering of the oil temperature T from T1 (for example, 60° C.). To be more specific, assuming the coefficient α when the oil temperature T exceeds T1 (for example, 60° C.) as 1.0 and the coefficient α when the oil temperature is T0 (for example, 0° C.) or below as 0 (zero), the coefficient α is set such that the coefficient α is decreased in accordance with lowering of the oil temperature T within a range of T0 to T1. Due to such setting, an orifice control that takes into account a viscosity characteristic of a working oil becomes possible where an OC solenoid energization time (t) is shortened in accordance with lowering of the oil temperature T and, at the same time, the OC solenoid energization time (t) becomes zero when the oil temperature T is below 0° C.

Figure 9:
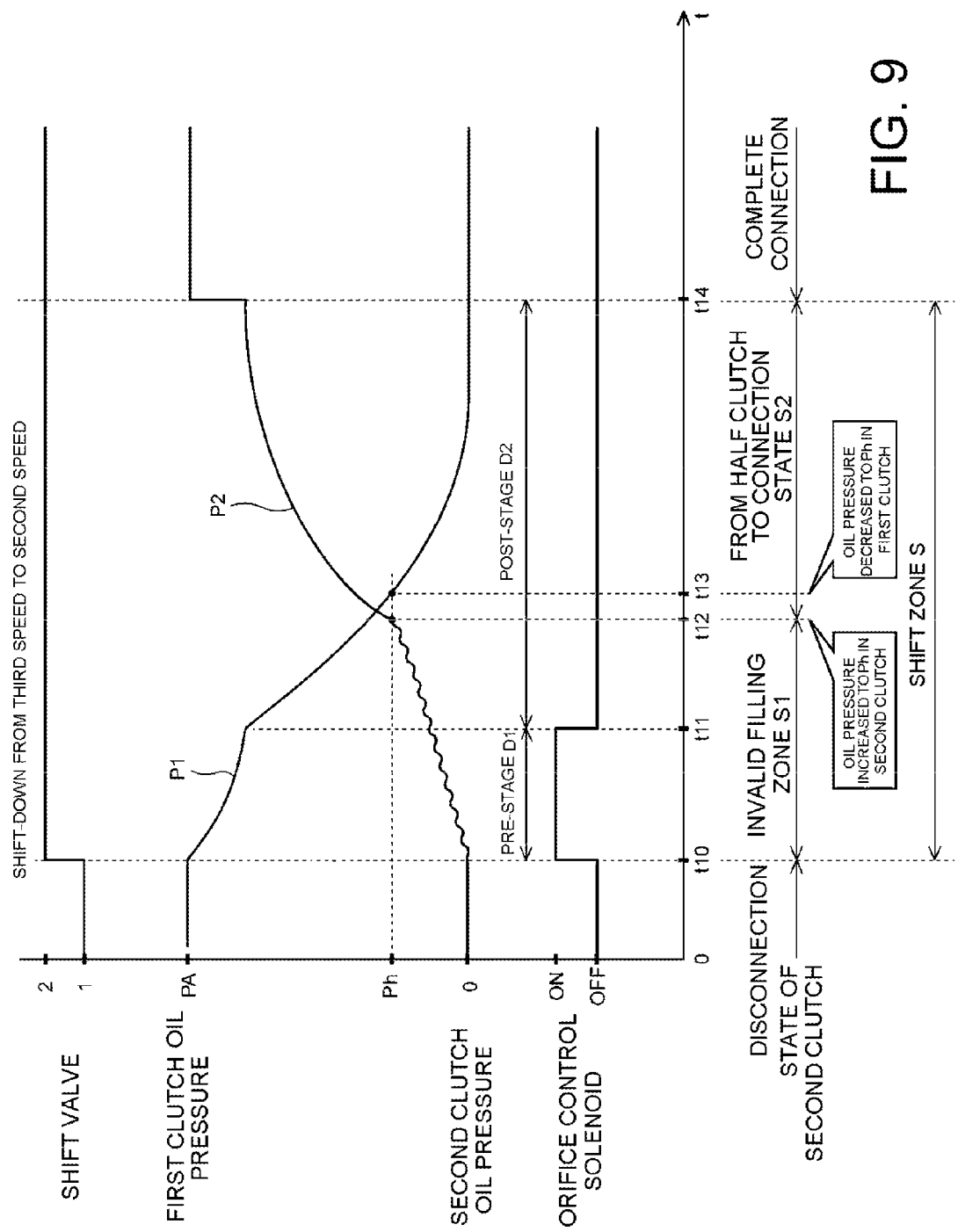
FIG. 9 is a graph showing the transition of a clutch oil pressure at the time of swapping clutches (at the time of low temperature).

FIG. 9 is a graph showing the transition of a clutch oil pressure at the time of swapping a clutch at the time of low temperature. At the time of low temperature, viscosity of the working oil is increased so that an invalid filling completion time is extended. In this case, there is a tendency that although an invalid filling zone S1 of the clutch on a connection side is extended in accordance with lowering of a temperature, a discharge speed of an oil pressure is lowered at a rate higher than a rate of lowering of the temperature (becoming difficult to discharge an oil pressure). This is because, although an oil pressure on the clutch on a connection side is press-fed by a hydraulic pump and is monitored by an oil pressure sensor, an oil pressure lowering speed of the clutch on a disconnection side depends on viscosity of the working oil unless a biasing force of the return spring of the clutch is changed.

To cope with such difficulty in discharging an oil pressure at the time of low temperature, in this embodiment, an energization time of the OC solenoid 46, that is, the pre-stage D1 is shortened compared to the case shown in FIG. 5 thus realizing both the prevention of racing of the engine at the time of a shift change and the reduction of a shift shock.

At a point of time t (t=0) during traveling at a third speed, the shift valve 42 is in a status 1 so that the complete connection oil pressure PA is supplied to the first clutch CL1, and an oil pressure supplied to the second clutch CL2 is zero so that the OC solenoid 58 is in an OFF state.

Next, at a point of time t10, a shift-down instruction from a third speed to a second speed is issued and hence, the shift valve 42 is changed over to a status 2 and, at the same time, the OC solenoid 58 is changed over to an ON state.

At this point of time t10, the increase of an oil pressure in the second clutch is started. At the same time, lowering of the first clutch oil pressure P1, which is the working oil pressure of the first clutch CL1, is started. However, the OC solenoid 58 is in an ON state and hence, a lowering speed of the oil pressure is suppressed.

At a point of time t11, the OC solenoid 58 is changed over to an OFF state and hence, discharge resistance of the first clutch CL1 is decreased. A timing of this point of time t11 is set earlier than the point of time t2 shown in FIG. 5. This timing setting is performed for shortening a time necessary for lowering the first clutch oil pressure P1 to the predetermined oil pressure Ph at which a half clutch state is finished by setting timing at which a flow passage area is increased earlier corresponding to a level of viscosity of a working oil.

At a point of time t12, the invalid filling zone S1 is finished and, at the same time, a clutch state is shifted to a connection state S2 from a half clutch state.

At a subsequent point of time t13, the first clutch oil pressure P1 is lowered to the predetermined oil pressure Ph and hence, the first clutch is brought into a state where a frictional force is not generated. However, at this point of time, the second clutch oil pressure P2 is already increased to a value larger than the predetermined oil pressure Ph and hence, a half clutch state is already started in the second clutch whereby there is no possibility that the transmission of a drive force is interrupted.

At a point of time t14 where the second clutch oil pressure P2 is increased to an oil pressure sufficient for transmitting a drive force, the oil pressure P2 is increased to the complete connection oil pressure PA, and a clutch swapping control brought about by shift-down is completed along with the completion of the shift zone S.

As has been described above, according to the transmission device of the invention, a switching timing of discharge resistance, which is changed over in two stages is changed corresponding to a change in easiness of discharge of an oil pressure corresponding to a change in viscosity of a working oil associated with an oil temperature. Accordingly, irrelevant to a change in oil temperature, it is possible to acquire a favorable shift shock preventing effect and a favorable engine stall preventing effect at the time of deceleration immediately after a shift change.

The shapes and the structures of the twin clutch and the transmission which constitute the AMT, the shapes and the structures of the shift valve and the linear solenoid, the structure of the orifice mechanism, the relationship between an energization time of the orifice control valve and a working oil temperature, a ratio between an invalid filling zone and a half clutch zone in FIG. 5, a length of a shift zone and the like are not limited to those described in the above-mentioned embodiment, and various modifications are conceivable. The embodiment has been explained with respect to the multiple-stage transmission having a plurality of shift positions consisting of odd-numbered rows and even-numbered rows for the first and second clutches respectively. However, the constitution where one kind of gear train is provided to respective clutches (for example, a two-stage transmission provided that the clutch used in the transmission is a twin clutch) may be used. Further, in the embodiment, the orifice includes the small open hole and the large open hole, and the large open hole is opened or closed by the valve. However, the sizes of two holes may be reversed or the sizes of two holes may be set equal. In the embodiment, the discharge resistance changing means is configured to change discharge resistance in two stages. However, the discharge resistance changing means may be configured to continuously change discharge resistance as in the case of a linear solenoid valve. Further, in addition to the constitution where discharge resistance is changed by changing a flow passage area as explained in conjunction with the embodiment, the discharge resistance changing means may be configured to change discharge resistance by changing a length of the flow passage. The transmission device according to the invention is not limited to a motorcycle, and is applicable to a twin clutch automatic transmission of various vehicles including a saddle-ride type three-wheeled vehicle.

DESCRIPTION OF REFERENCE NUMBERS

1: AMT, 3: engine, 4: crank shaft, 24: AMT control unit (control means), 36: hydraulic pump (oil pressure generating means), 39: shift solenoid, 40, 41: supply oil passage, 42: shift valve (oil passage switching means), 44, 45: discharge oil passage, 46: orifice mechanism (discharge resistance changing means), 51: large open hole (second open hole), 52: valve mechanism, 53: biasing member (biasing means), 54: small open hole (first open hole), 56: merging portion, 57: merged discharge oil passage, 58: orifice control solenoid, 59: orifice, CL1: first clutch, CL2: second clutch, P1: first clutch oil pressure (working oil pressure), P2: second clutch oil pressure (working oil pressure), TCL: twin clutch, TM: transmission, S1: invalid filling zone, S2: half clutch to connection state, S: shift zone, D1: pre-stage, D2: post-stage

What is claimed is:
1. A transmission device, comprising:
a crank shaft of an engine;
a drive wheel;
first and second hydraulic clutches that are interposed between the crank shaft and the drive wheel and perform connection and disconnection due to pressurization and depressurization of a working oil, said hydraulic clutches being biased toward a disconnection side; and
gear trains that respectively correspond to the first and second hydraulic clutches, wherein the transmission device performs a shift change by selecting the respective gear train corresponding to one of the hydraulic clutches, the transmission further comprising:
an oil pressure generating unit that is a source for generating an oil pressure supplied to the first and second hydraulic clutches;
an oil pressure adjusting unit that is interposed between the oil pressure generating unit and the first and second hydraulic clutches and adjusts working oil pressure of the working oil supplied to each of the hydraulic clutches to desired levels;
first and second supply oil passages that are respectively connected to the first and second hydraulic clutches for supplying the pressurized working oil from the oil pressure adjusting unit to each of the hydraulic clutches;
first and second discharge oil passages that are respectively connected to the first and second supply oil passages for depressurizing the working oil supplied to each of the hydraulic clutches;
an oil passage switching unit adapted to discharge the working oil from the second discharge oil passage while supplying the working oil to the first supply oil passage and adapted to discharge the working oil from the first discharge oil passage while supplying the working oil to the second supply oil passage; and
a control unit that controls the oil pressure adjusting unit and the oil passage switching unit, wherein the transmission device further comprises:

a discharge resistance changing unit that is provided downstream of the first and second discharge oil passages and adapted to adjust discharge resistance of the working oil; and an oil temperature measuring unit that measures an oil temperature of the working oil associated with each of the first and second hydraulic clutches, wherein out of the first and second hydraulic clutches, an oncoming friction clutch which is brought into a connection state after the shift change is configured to generate an invalid filling zone where friction force is not generated on a clutch plate and a respective half clutch zone that comes after the invalid filling zone and in which friction force is generated on the clutch plate during a shift period where the oncoming friction clutch is being engaged, and an off-going friction clutch which is brought into a disconnection state after the shift change is configured to generate a respective half clutch zone during a shift period where the off-going friction clutch is being disengaged, and the control unit controls the discharge resistance changing unit corresponding to a measured value of the oil temperature measuring unit at the time of the shift change such that the off-going clutch is brought into an operational state where friction force is not generated after finishing its respective half clutch zone when the oncoming clutch is in its respective half clutch zone after the invalid filling zone is finished.

2. The transmission device according to claim 1, wherein a discharge resistance of the working oil in a pre-stage, which is a zone ranging from starting of a shift zone to a predetermined timing, is increased compared to a discharge resistance of the working oil in a post-stage, which is a zone ranging from the completion of the pre-stage to the completion of the shift zone.

3. The transmission device according to claim 2, wherein the discharge resistance changing unit is configured to change over the discharge resistance in two stages, and the control unit changes over the discharge resistance such that the discharge resistance is increased in the pre-stage compared to the discharge resistance in the post-stage.

4. The transmission device according to claim 3, wherein the discharge resistance changing unit is configured to be driven so as to increase the discharge resistance only in the pre-stage.

5. The transmission device according to claim 4, wherein the discharge resistance changing unit is arranged downstream of a merging portion where the first and second discharge oil passages are merged into one merged discharge oil passage, and the discharge resistance changing unit comprises:
a first release hole and a second release hole;
a valve mechanism that is capable of opening or closing the second release hole;
a biasing unit that holds the valve mechanism in an open state; and
an actuator that moves the valve mechanism in the closing direction when a closing instruction is given from the control unit.

6. The transmission device according to claim 5, wherein the control unit, when the oil temperature of the working oil falls within a predetermined range, shortens the pre-stage in accordance with lowering of the oil temperature.

7. The transmission device according to claim 4, wherein the control unit, when the oil temperature of the working oil falls within a predetermined range, shortens the pre-stage in accordance with lowering of the oil temperature.

8. The transmission device according to claim 3, wherein the control unit, when the oil temperature of the working oil falls within a predetermined range, shortens the pre-stage in accordance with lowering of the oil temperature.

9. The transmission device according to claim 2, wherein the discharge resistance changing unit is configured to be driven so as to increase the discharge resistance only in the pre-stage.

10. The transmission device according to claim 9, wherein the discharge resistance changing unit is arranged downstream of a merging portion where the first and second discharge oil passages are merged into one merged discharge oil passage, and the discharge resistance changing unit comprises:
a first release hole and a second release hole;
a valve mechanism that is capable of opening or closing the second release hole;
a biasing unit that holds the valve mechanism in an open state; and
an actuator that moves the valve mechanism in the closing direction when a closing instruction is given from the control unit.

11. The transmission device according to claim 10, wherein the control unit, when the oil temperature of the working oil falls within a predetermined range, shortens the pre-stage in accordance with lowering of the oil temperature.

12. The transmission device according to claim 9, wherein the control unit, when the oil temperature of the working oil falls within a predetermined range, shortens the pre-stage in accordance with lowering of the oil temperature.

13. The transmission device according to claim 2, wherein the control unit, when the oil temperature of the working oil falls within a predetermined range, shortens the pre-stage in accordance with lowering of the oil temperature.

14. The transmission device according to claim 1, wherein the discharge resistance changing unit is arranged downstream of a merging portion where the first and second discharge oil passages are merged into one merged discharge oil passage, and the discharge resistance changing unit comprises:
a first release hole and a second release hole;
a valve mechanism that is capable of opening or closing the second release hole;
a biasing unit that holds the valve mechanism in an open state; and
an actuator that moves the valve mechanism in the closing direction when a closing instruction is given from the control unit.

15. The transmission device according to claim 14, wherein the control unit, when the oil temperature of the working oil falls within a predetermined range, shortens the pre-stage in accordance with lowering of the oil temperature.

16. The transmission device according to claim 1, wherein the control unit, when the oil temperature of the working oil falls within a predetermined range, shortens the pre-stage in accordance with lowering of the oil temperature.

* * * * *